United States Patent

Orihara et al.

[11] Patent Number: 5,814,387
[45] Date of Patent: Sep. 29, 1998

[54] RUBBER BAND FOR REPAIRS AND METHOD THEREFOR

[75] Inventors: Seiichi Orihara; Yoshiji Orihara, both of Tokyo, Japan

[73] Assignee: Orihara Manufacturing Co., Ltd., Tokyo, Japan

[21] Appl. No.: 585,468

[22] Filed: Jan. 16, 1996

[30] Foreign Application Priority Data

Jan. 24, 1995 [JP] Japan ................................. 7-27192
Sep. 6, 1995 [JP] Japan ................................. 7-252045

[51] Int. Cl.$^6$ ................................. F16L 55/168
[52] U.S. Cl. ................................. 428/63; 138/97; 138/98; 138/99; 285/15
[58] Field of Search ................................. 138/99, 97, 98; 285/15; 428/343, 63, 231, 230

[56] References Cited

U.S. PATENT DOCUMENTS

| 2,924,546 | 2/1960 | Shaw . | |
|---|---|---|---|
| 4,153,747 | 5/1979 | Young et al. | 138/99 X |
| 4,359,502 | 11/1982 | Capanigro et al. | 138/99 X |
| 5,030,493 | 7/1991 | Rich | 138/97 X |
| 5,247,967 | 9/1993 | Bourgue | 138/97 X |

FOREIGN PATENT DOCUMENTS

| 0574060 | 5/1993 | European Pat. Off. . |
| A2613000 | 4/1987 | France . |
| 56-35991 | 4/1981 | Japan . |
| 56-37787 | 4/1981 | Japan . |
| 58-101943 | 6/1983 | Japan . |
| 61-206654 | 12/1986 | Japan . |
| 63-176892 | 7/1988 | Japan . |
| 3255297 | 11/1991 | Japan . |
| 573083 | 8/1971 | Switzerland . |
| 2241987 | 3/1991 | United Kingdom . |
| 2287079 | 2/1995 | United Kingdom . |

OTHER PUBLICATIONS

An English Language Abstract of JP 3–255297.
An English Language Abstract of JP 61–206654.
An English Language Abstract of JP 56–35991.
An English Language Abstract of JP 56–37787.
An English Language Abstract of JP 63–176892.
An English Language Abstract of JP 58–101943.
A Japanese Office Action in connection with JP Application No. 7-27192.
English language translation of the Japanese Office Action issued in connection with Japanese Application No. 7–27192.
Japanese Office Action issued in connection with Japanese Application No. 7–27192.
"Soviet Inventions Illustrated", Section PQ, Week 9226, 12 Aug. 1992, Derwent Publication Ltd., London, GB; Class Q, AN 92–215469 and SU–A–1 681 130.
European Search Report.

*Primary Examiner*—Daniel Zirker
*Attorney, Agent, or Firm*—Greenblum & Bernstein, P.L.C.

[57] ABSTRACT

The present invention relates to a rubber band for pipe repairs that can be tightly wound about a pipe of various types at a portion where fluid is leaking to cut off the leakage. A tentative fixing means is provided on one end of the rubber band and a retaining means is provided on the other to prevent the wound rubber band from loosening. After cutting off the leakage with the rubber band, a mending tape applied with a substance that reacts with water and becomes hardened is conveniently wound over the rubber band.

22 Claims, 20 Drawing Sheets

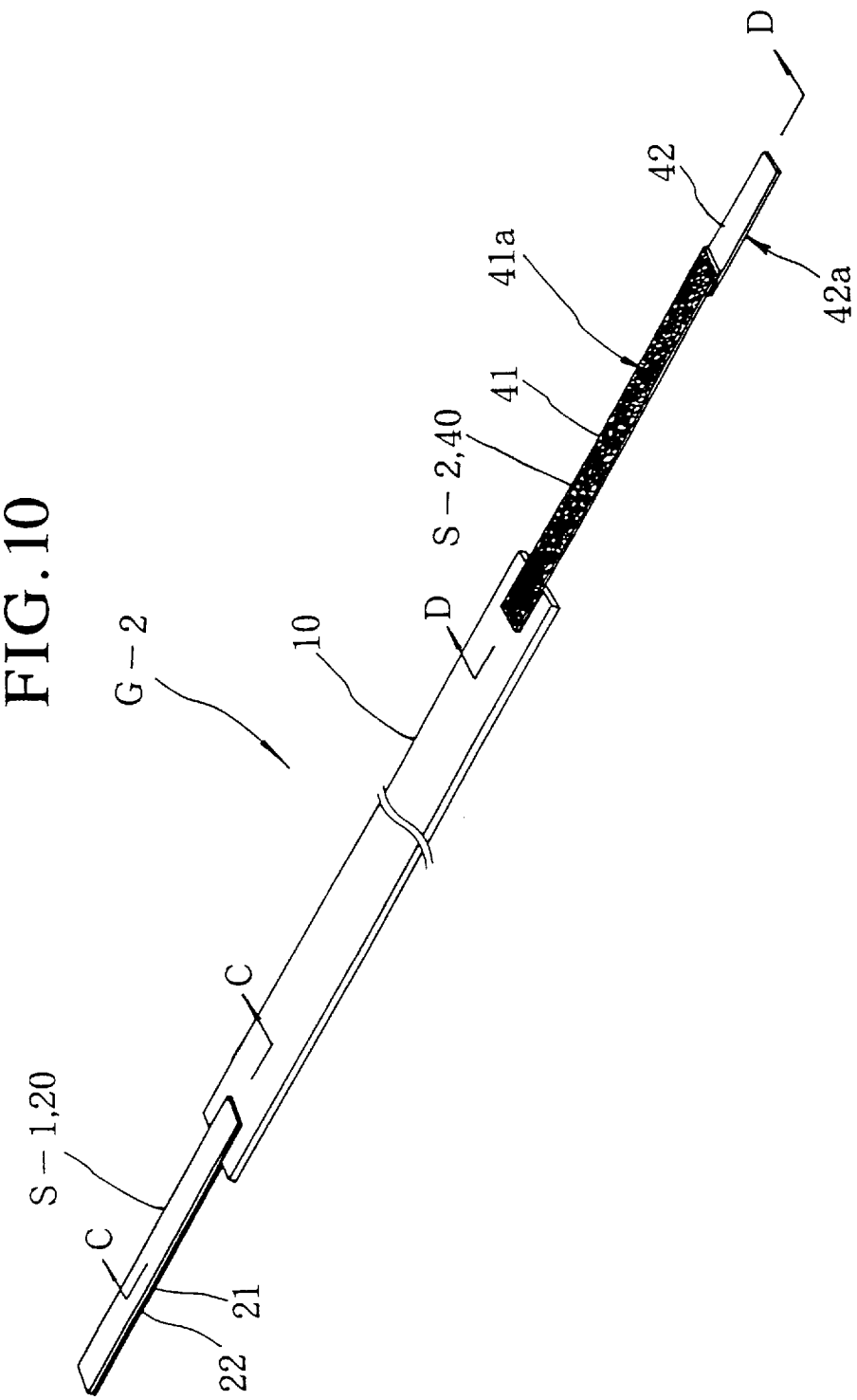

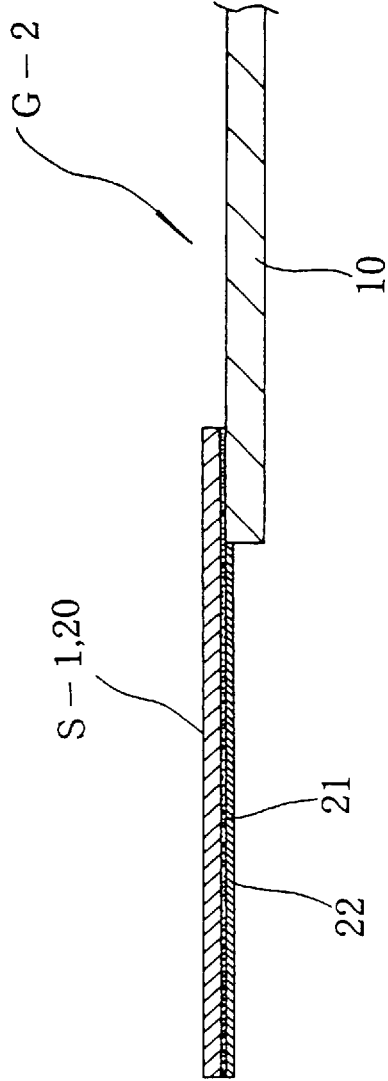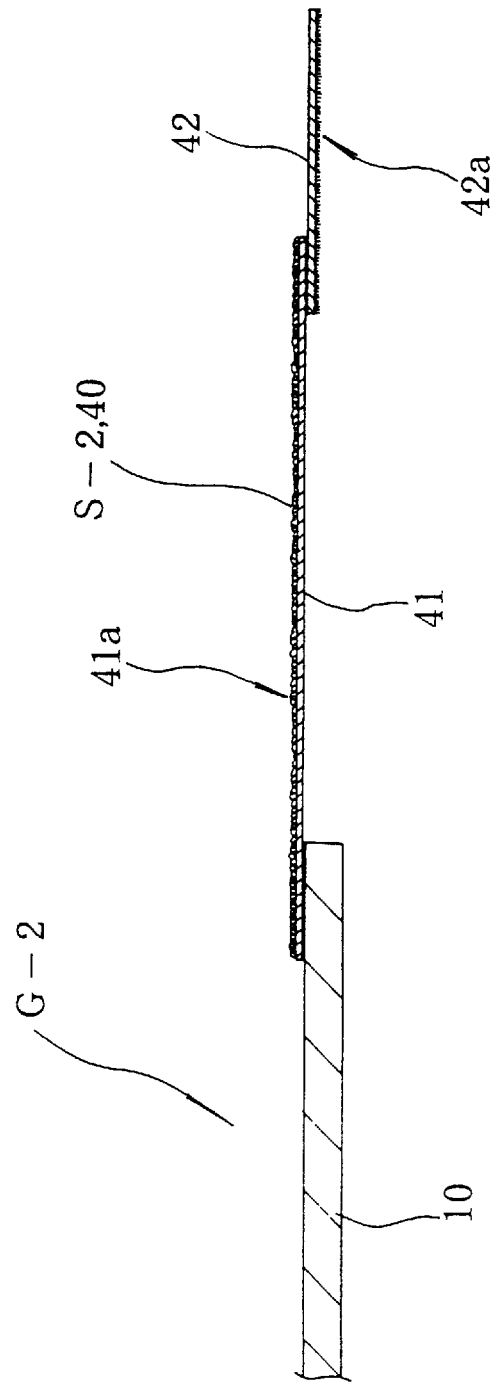

RUBBER BAND FOR REPAIRS AND METHOD THEREFOR

BACKGROUND OF THE INVENTION AND RELATED ART

The present invention relates to rubber bands for pipe repairs to be bound around various types of pipes such as water supply/exhaust and gas pipes at portions where fluid such as liquids and gasses are leaking and a method of repairing pipes using the rubber band.

As a method of cutting off leakage caused, for instance, by cracks formed in various types of piping system such as water supply/exhaust pipes without replacing the pipes, there is known a method of binding the pipe with a mending tape containing a substance which reacts with water and become hardened such as polyurethane prepolymer and sealing the leakage with the mending tape which has thus hardened.

Mending tapes of this kind require a certain period of time before they become hardened. In case of a water exhaust pipe which is not under any water pressure, the mending tape can be used to effectively seal the leakage. However, in case where water is leaking from a water supply pipe, the tape cannot be used as it is. In other words, as water leaking from the pipe gushes out by the pressure of water flowing inside and presses the mending tape covering the leaking portion, there will be formed a gap between the pipe and the tape before the mending tape becomes hardened. Even after the mending tape has hardened, the gap remains, failing to seal the leakage. To overcome the problem, it was necessary to close the supply valve and repair the pipes while the water supply was suspended. However, suspension of water supply entails numerous troubles and should not be performed without due consideration. Chances for suspension are also quite limited, particularly in the case of buildings such as condominiums or hospitals where constant water supply is indispensable.

Conventionally, when leakage occurred in the water supply pipe, a tube made of rubber was bound about the pipe where it was leaking to wait until the time when it became appropriate to suspend the water supply, whereupon the valve was closed and the cracked pipe causing the leak was replaced.

However, when water is gushing out from the pipe, rubber tubes cannot be so easily applied. Moreover, sealing with such rubber tubes is essentially a temporary means and it is always necessary to eventually replace the cracked pipe regardless of the extent of the cracking or the labor involved in replacing the pipe.

It has been proposed to bind the cracked portion first with the rubber tube and then with said mending tape and allow the latter to become hardened to thereby avoid replacing the pipe with a new one. In this case, however, the knot of the tube hinders application of the mending tape, making it difficult to tightly bind the mending tape about the periphery of the water pipe. This makes it difficult to permanently seal the pipe. It is further defective in that the cracked portion where the rubber tube and the mending tape are applied forms a big bump and presents an unfavorable appearance when the repair is completed.

OBJECTS AND SUMMARY OF THE INVENTION

One of the main objects of the present invention is to provide a rubber band for pipe repairs which can be easily applied about the pipe in a tight manner at a portion where the fluid flowing inside the pipe is leaking.

Another object of the present invention is to provide a method for pipe repairs wherein after sealing the leaking liquid with said rubber band, a mending tape containing a substance which reacts with water and becomes hardened is applied without inconvenience over said rubber band, so that pipes for supplying fluids such as liquid and gas under pressure can be repaired without replacing the pipe itself.

It has been noted that pipes have irregular surfaces caused by rusts which are formed with time in case of metal pipes, or by adhesion of dusts in case of plastic pipes. Under such conditions, it is often difficult to tightly bind the rubber band as a tentative sealing over the cracking formed on such irregular pipe surface.

In the case of pipes connected by means of pipe joints, a stepped portion equal in height with the wall thickness of the joint is formed. If the fluid is leaking from a portion near such joint, it is again difficult to tightly bind the rubber band.

It is therefore an object of the present invention to provide a rubber band for pipe repairs which can be tightly applied at the cracked portion of a pipe and securely seal the leakage even when the pipe surface is irregular or the crack is located near the stepped portion.

These and various other objects of the present invention will become apparent from the following description.

To achieve the objects mentioned above, the rubber band to be wound about a pipe at a portion where fluid such as liquid and gas is leaking is provided at one end with a means to tentatively seal the pipe and a retaining means to prevent loosening of the rubber band provided at the other end thereof.

As a means to achieve said objects, there is also provided a rubber band which has, on the end where the tentative fixing means is provided, a sealant applied on the band face that comes in contact with the pipe.

As another means to achieve said objects, the rubber band according to the present invention uses butadiene base rubber as the sealant.

As still another means to achieve said objects, the surface of the sealant of the rubber band is covered with a liner that can be peeled off.

As yet another means to achieve said objects, the tentative fixing means and/or the retaining means of the rubber band is an adhesive tape.

As still another means to achieve said objects, the tentative fixing means and/or the retaining means of the rubber band is a face-to-face fastener which comprises a female member on its one side and a male member on the other side.

To achieve said objects, there is provided a pipe repair method which comprises the steps of binding a rubber band of various constructions mentioned above about the leaking portion of a pipe and applying over said rubber band a mending tape provided with a substance which reacts with water and becomes hardened.

BRIEF DESCRIPTION OF THE ACCOMPANYING DRAWINGS

FIG. 1 is a perspective view to show the rubber band G-1 of the first embodiment having adhesive tapes 20 and 30 at both ends of the band main body 10 respectively, facilitating understanding of its entire construction.

Figure 6:
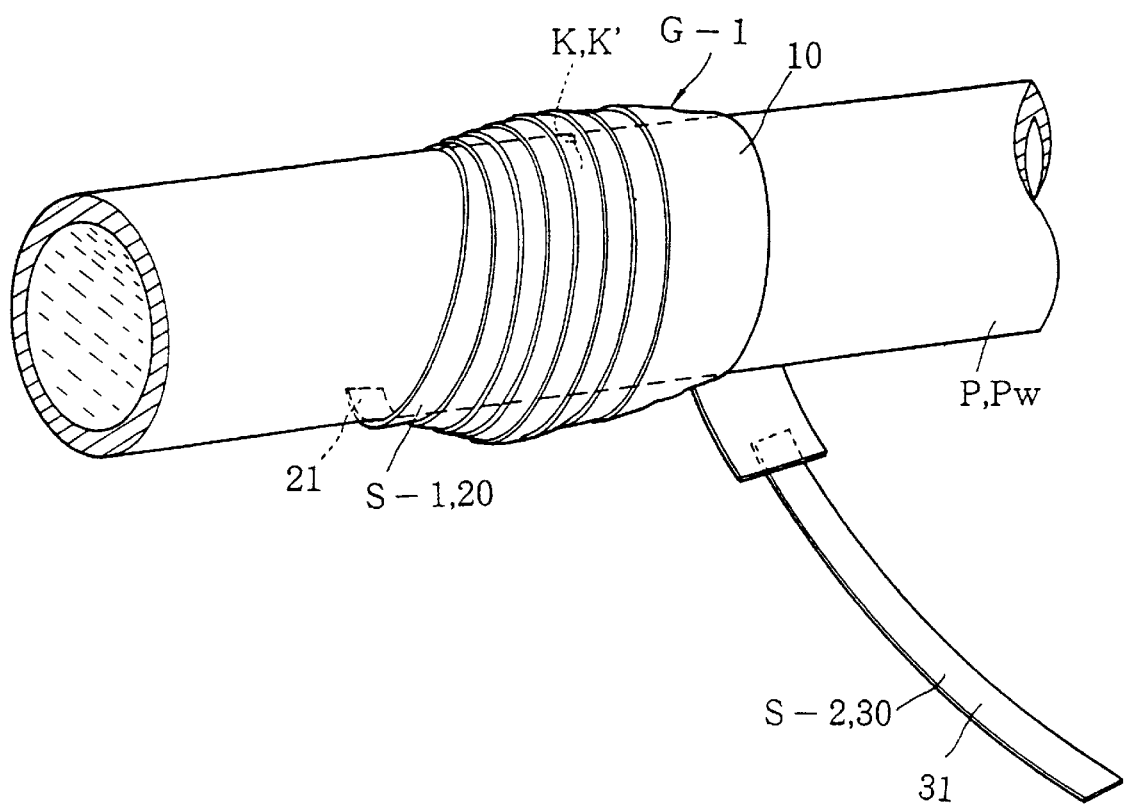
Figure 7:
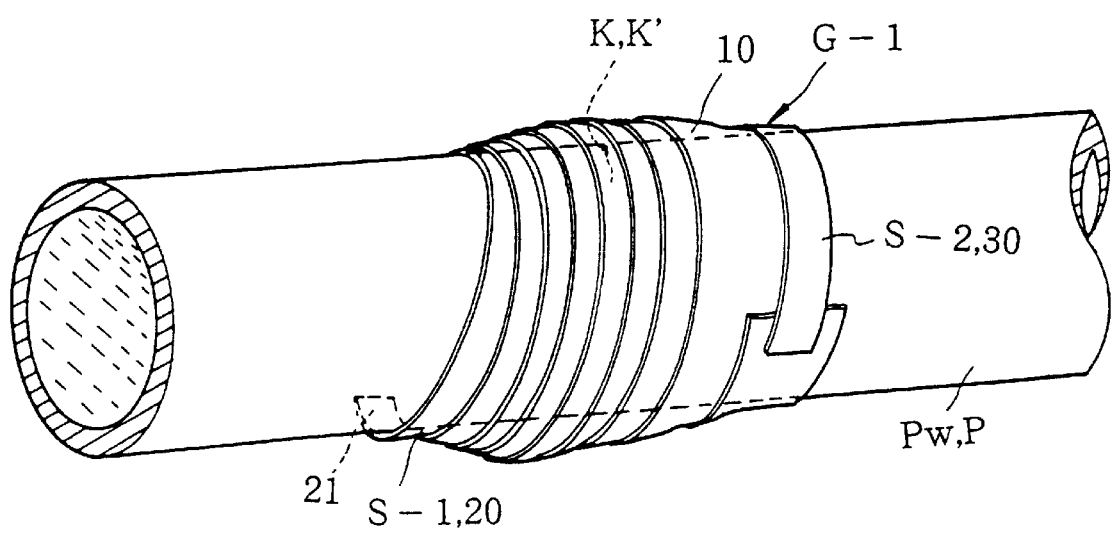
Figure 8:
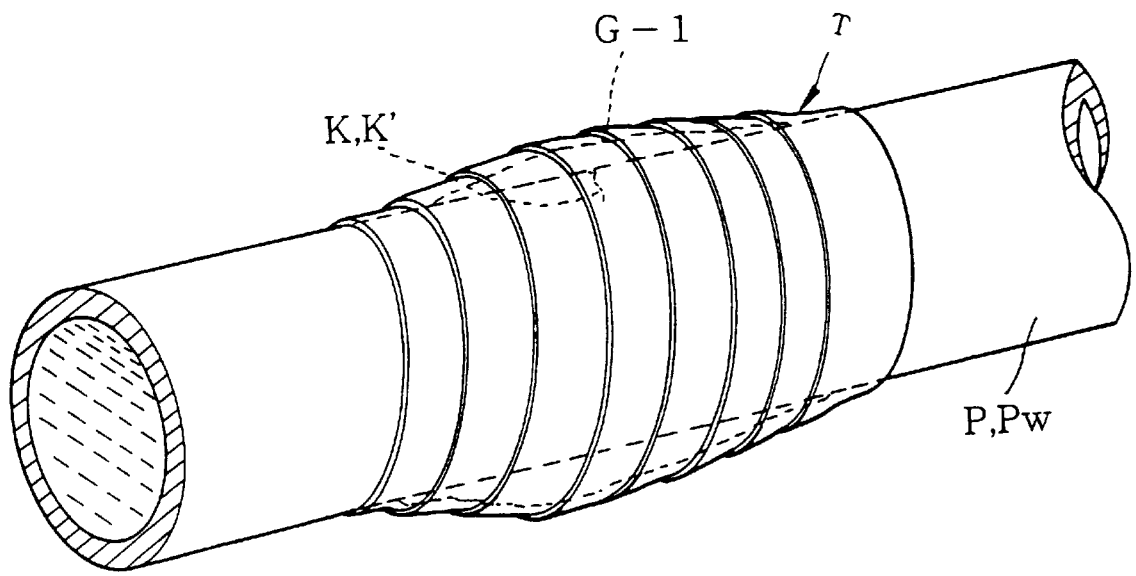
Figure 9:
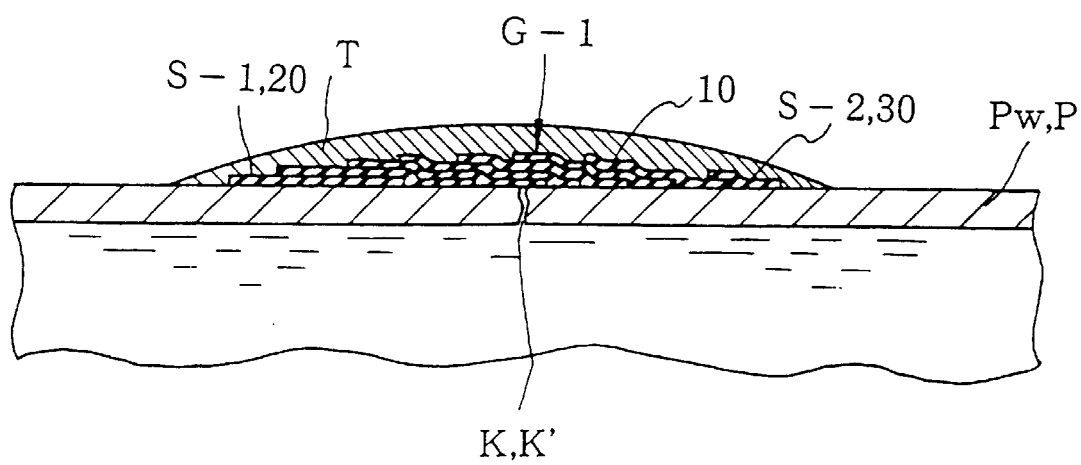

FIGS. 4 through 9 show how the rubber band G-1 is used on a pipe P; i.e. when repairing a water supply/exhaust pipe Pw using the rubber band G-1 (FIGS. 4 through 7) and when the repair work is completed (FIGS. 8 and 9).

FIG. 10 is a perspective view to show the rubber band G-2 of the second embodiment having adhesive tape 20 on one end and a face-to-face fastener 40 on the other end of the band main body 10, facilitating understanding of the entire construction of the rubber band G-2.

FIG. 11 is a sectional view of the rubber band G-2 along the line C—C in FIG. 10, facilitating understanding of the construction of the adhesive tape 20 provided on one end of the band main body 10 of the second embodiment.

FIG. 12 is a sectional view of the rubber band G-2 along the line D—D in FIG. 10, facilitating understanding of the construction of the adhesive tape 40 provided on the other end of the band main body 10.

Figure 13:
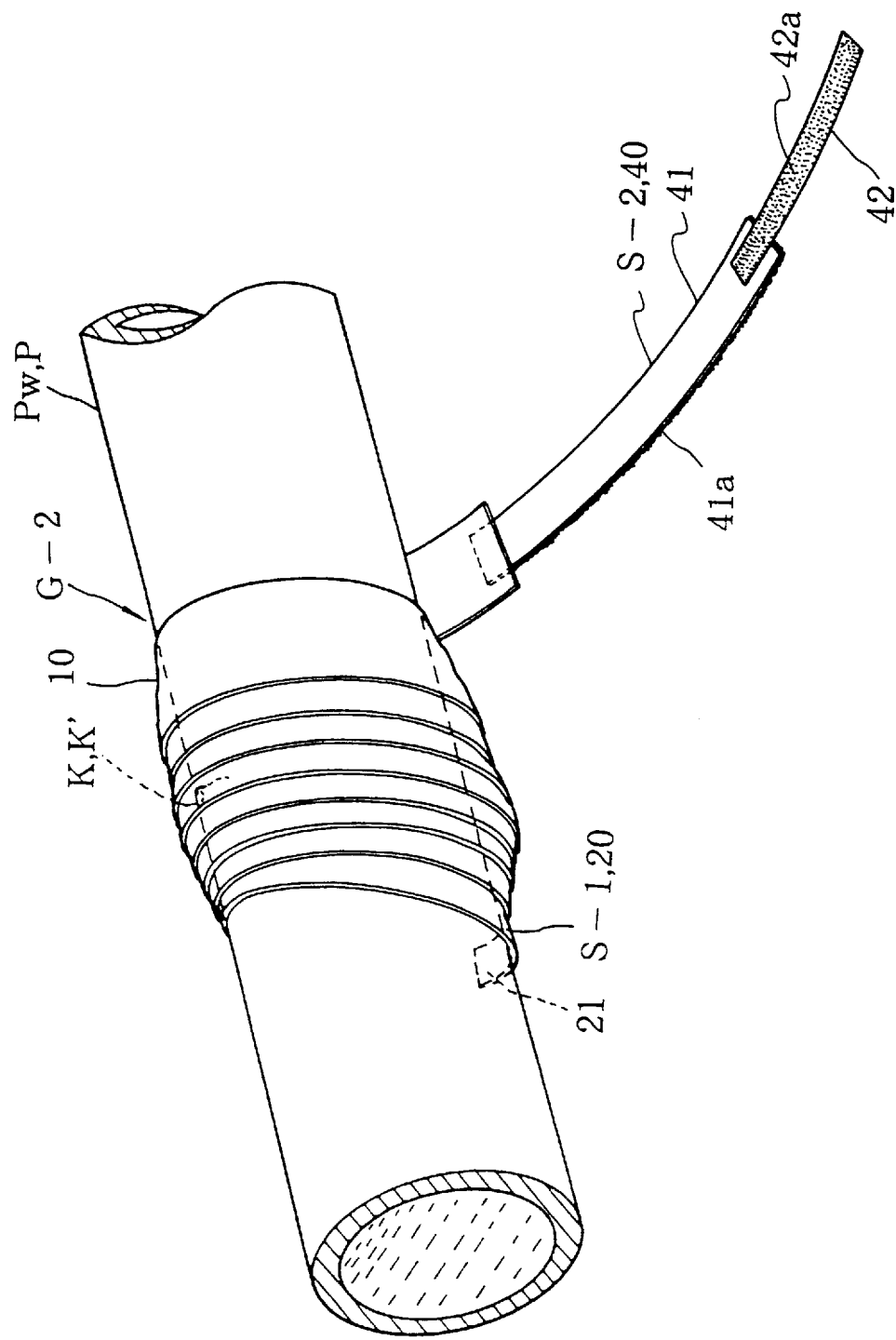

FIG. 13 shows how the rubber band G-2 is used.

Figure 14:
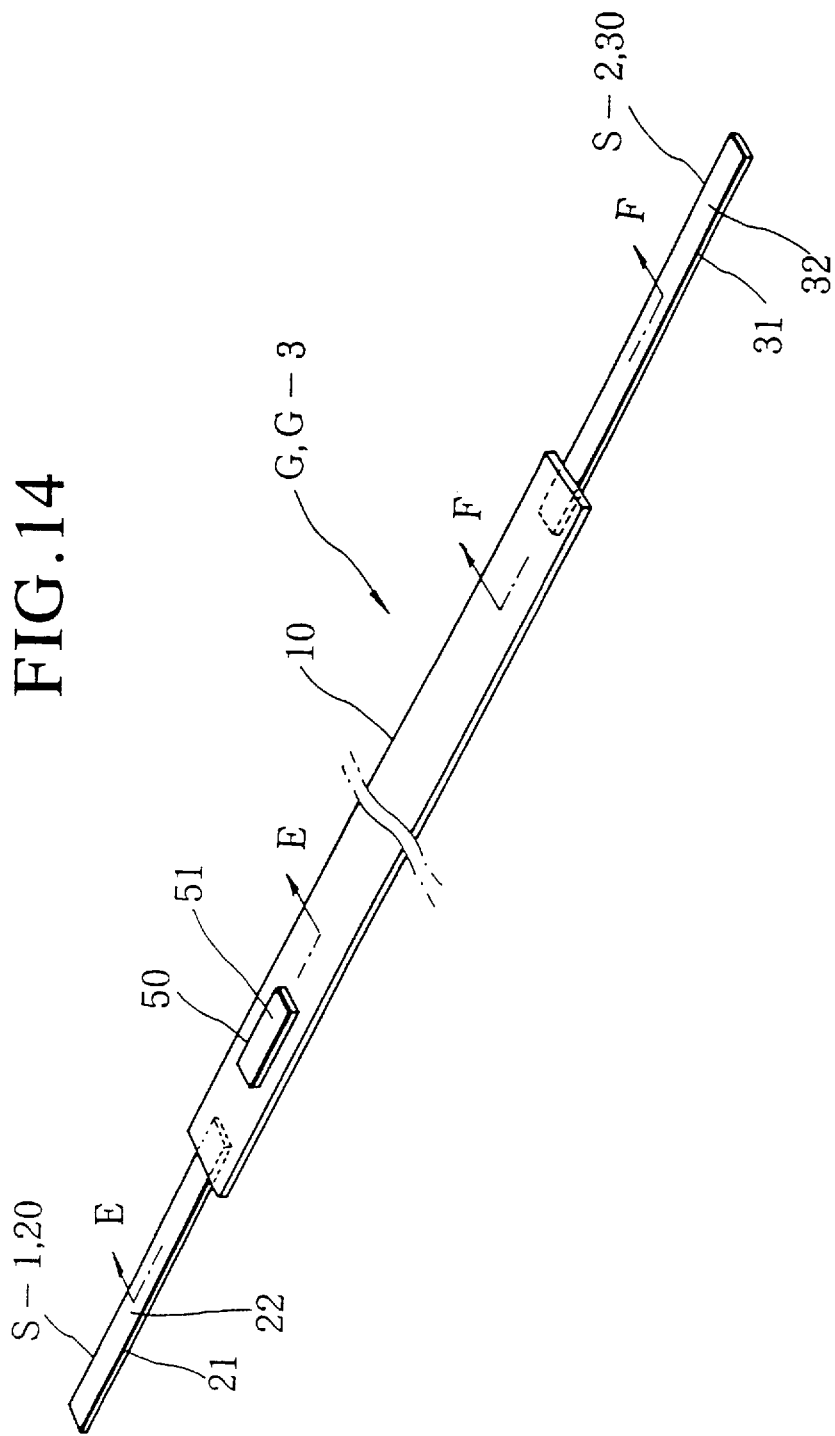

FIG. 14 is a perspective view to show the rubber band G-3 of the third embodiment having adhesive tapes 20 and 30 on both ends of the band main body 10, facilitating understanding of its entire construction.

Figure 15:
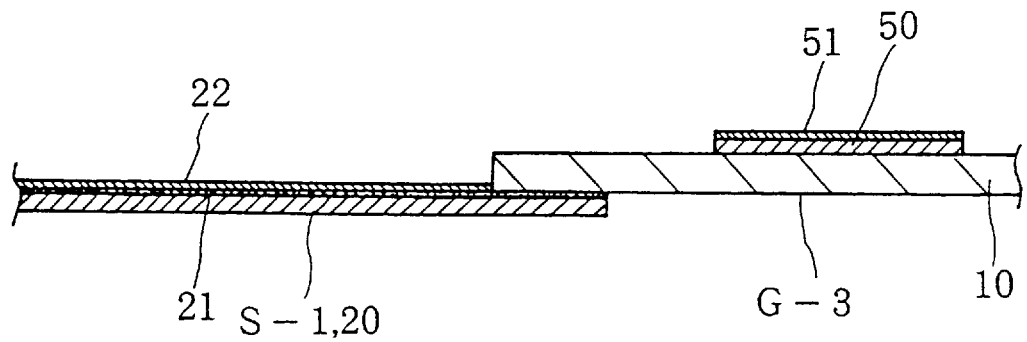

FIG. 15 is a sectional view of the rubber band G-3 along the line E—E in FIG. 14 to facilitate understanding of the construction of the adhesive tape 20 provided on one end of the band main body 10 of the third embodiment.

Figure 16:
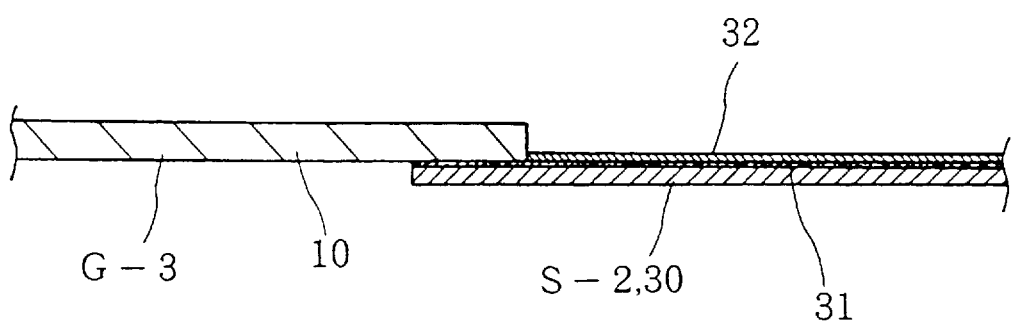

FIG. 16 is a sectional view of the rubber band G-3 along the line F—F in FIG. 14 to facilitate understanding of the construction of the adhesive tape 30 provided on the other end of the band main body 3 of the third embodiment.

Figure 18:
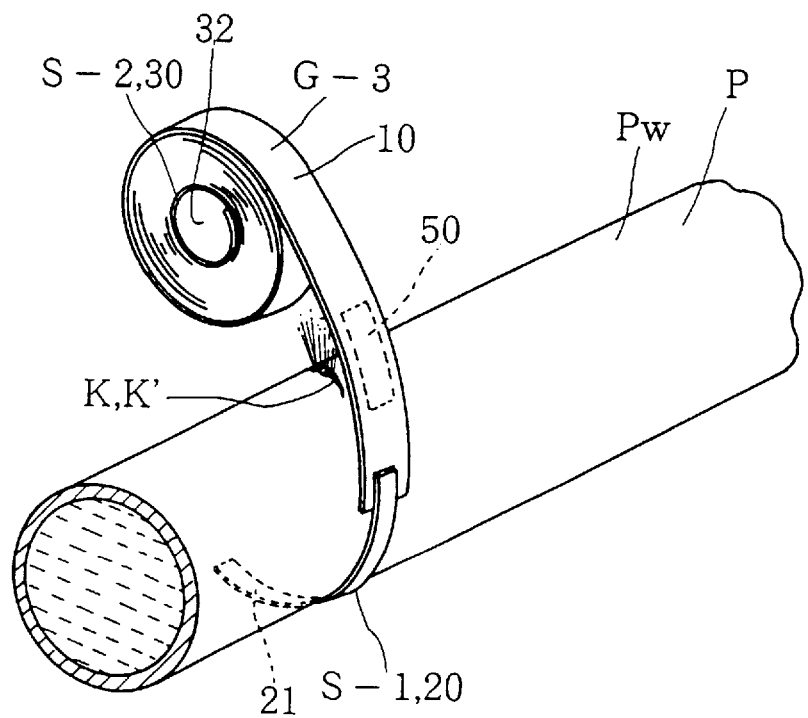
Figure 19:
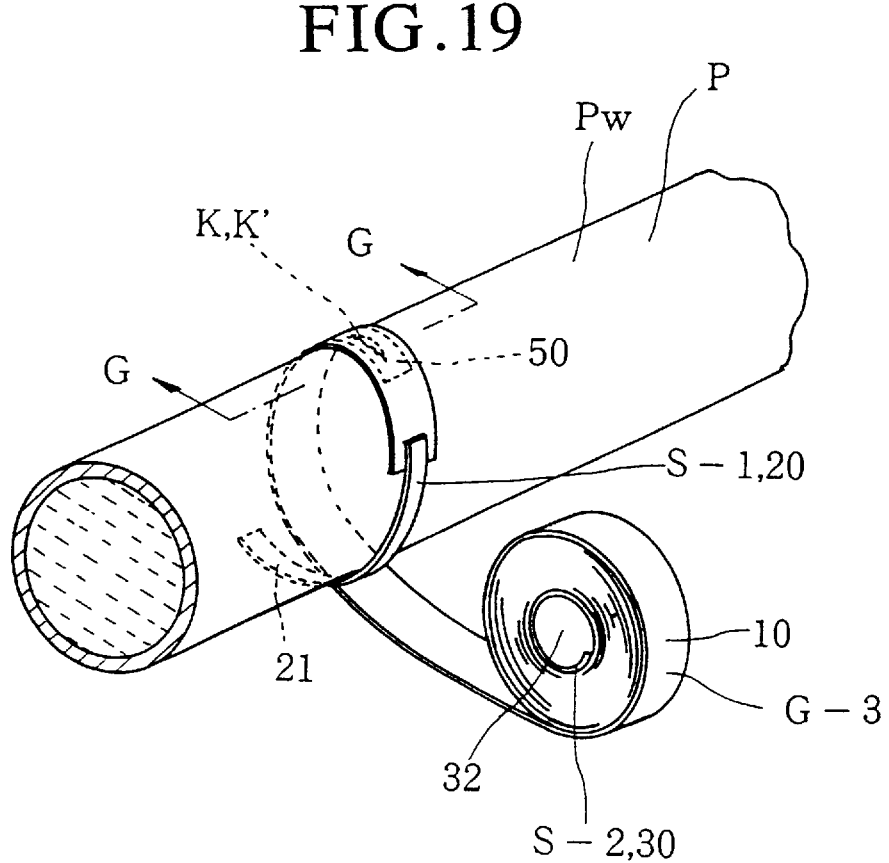
Figure 20:
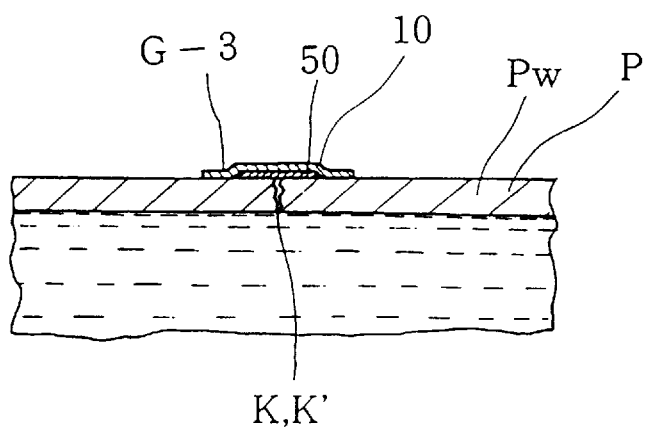
Figure 23:
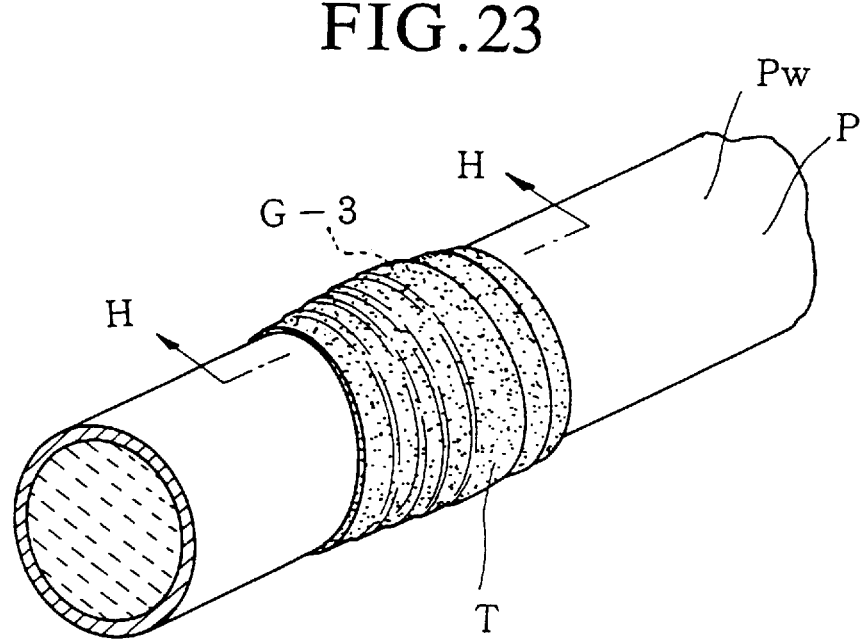
Figure 24:
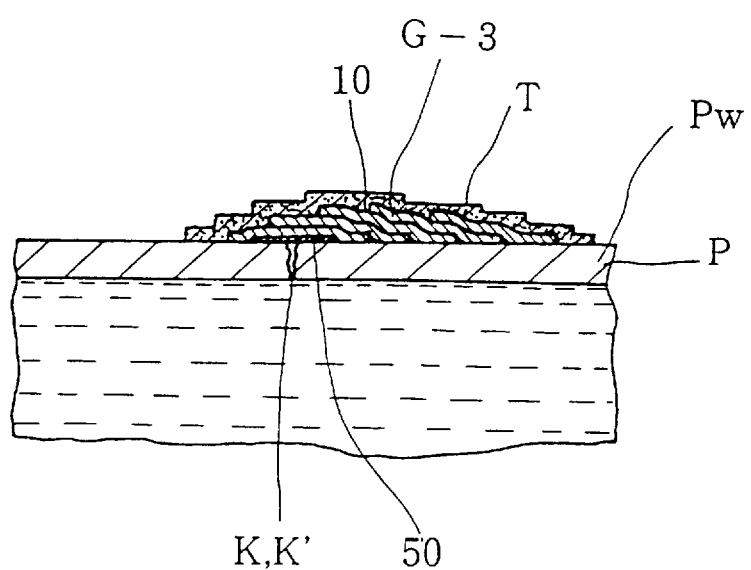

FIGS. 17 through 24 show how the rubber band G-3 is used on a pipe P; i.e. when repairing or cutting off the leakage from a water supply/exhaust pipe Pw (FIGS. 17 through 22) and when the cut-off work is completed (FIGS. 23, 24). FIG. 20 is a sectional view along the line G—G in FIG. 19, while FIG. 24 another sectional view along the line H—H in FIG. 23.

Figure 25:
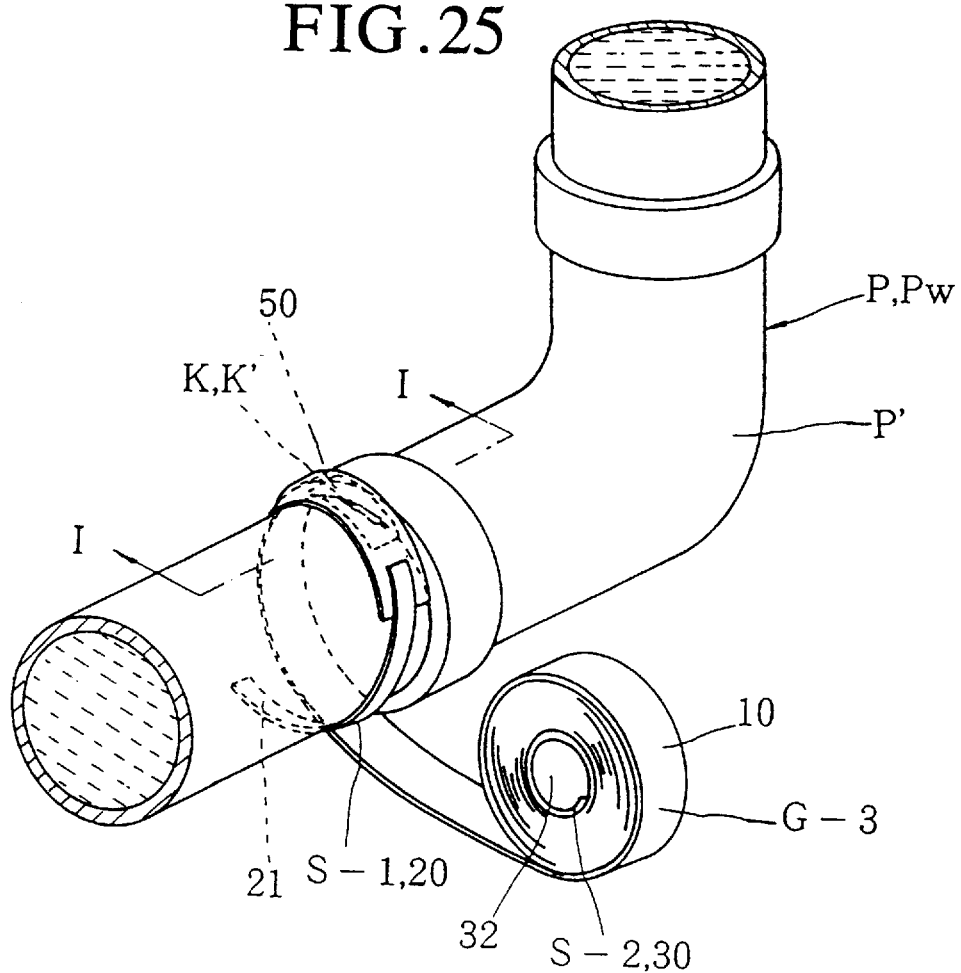
Figure 26:
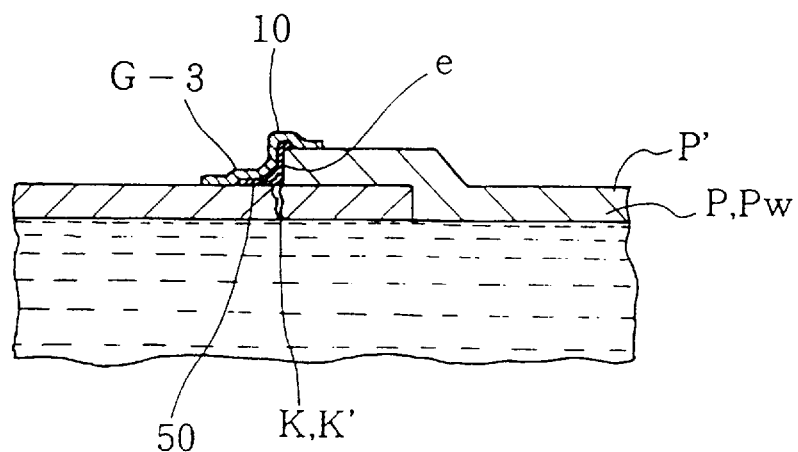

FIGS. 25 and 26 show how the rubber band G-3 is used to cut off leakage at a site near a pipe joint P'. FIG. 26 is sectional view along the line I—I in FIG. 25.

Figure 27:
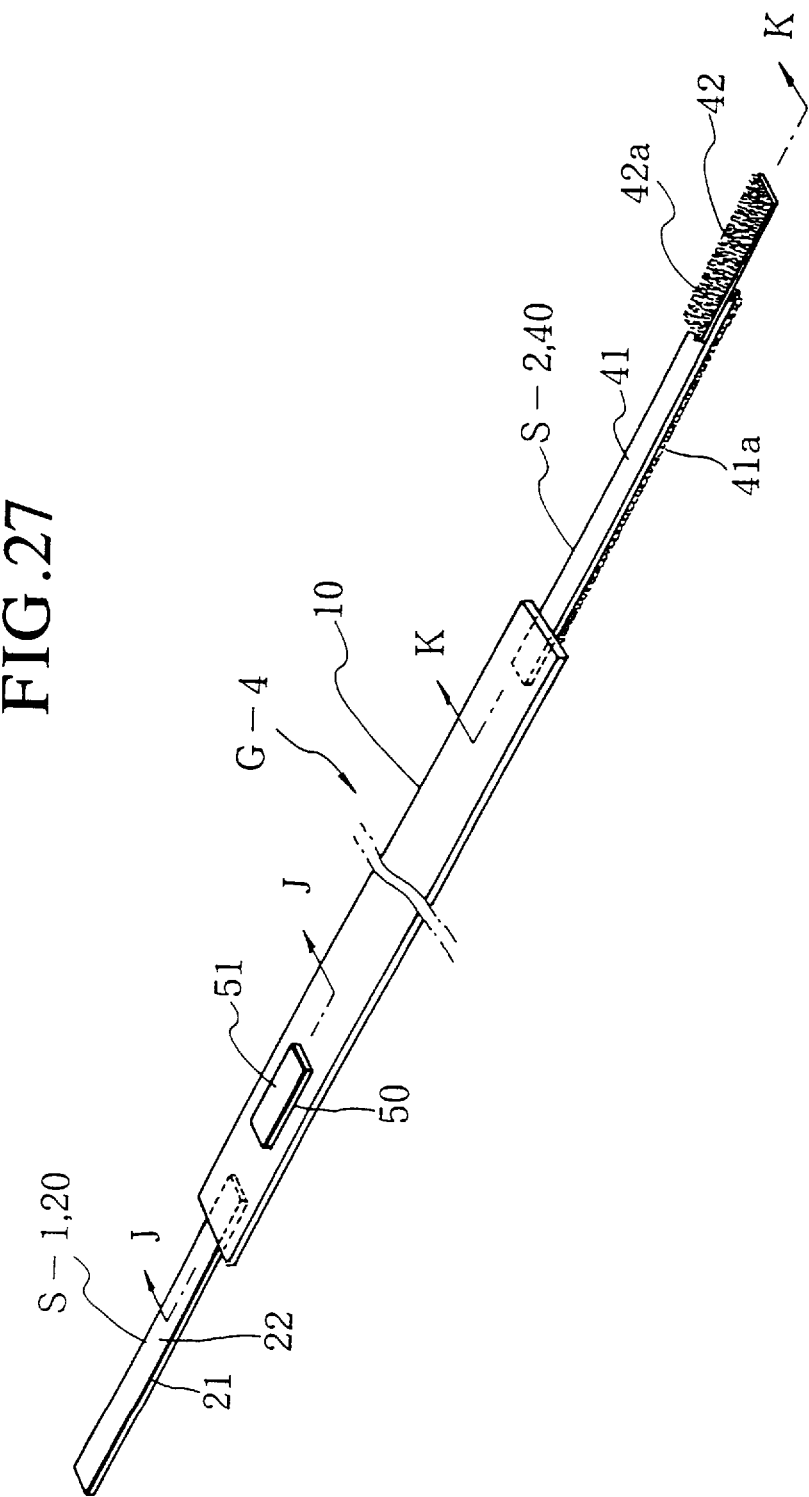

FIG. 27 is a perspective view to show the rubber band G-4 having an adhesive tape 20 on one end and a face-to-face fastener 40 on the other end of the band main body 10, facilitating understanding of its entire construction.

Figure 28:
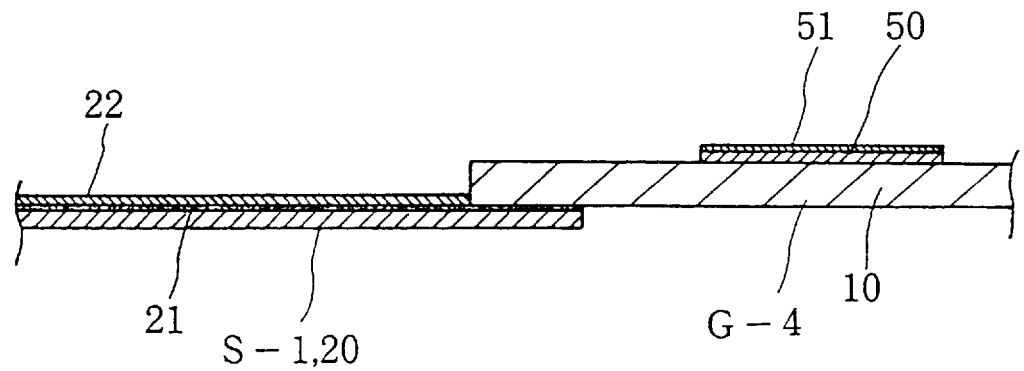

FIG. 28 is a sectional view along the line J—J in FIG. 27 to facilitate understanding of the adhesive tape 20 provided on one end of the band main body 10 of the fourth embodiment.

Figure 29:
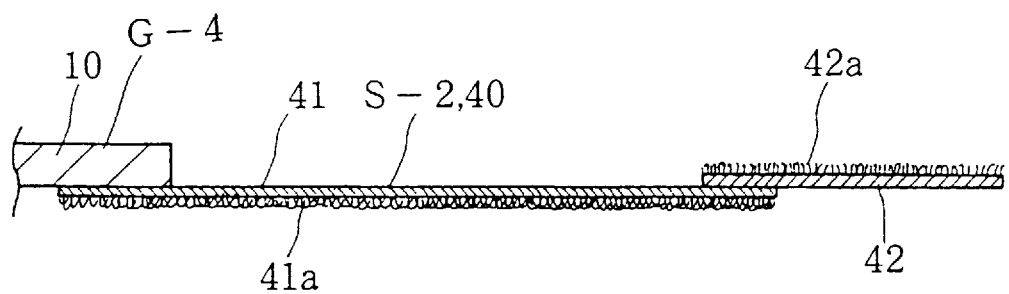

FIG. 29 is a sectional view of the rubber band G-4 along the line K—K in FIG. 27 to facilitate understanding of the construction of the face-to-face fastener 40 provided on the other end of the band main body of the fourth embodiment.

Figure 30:
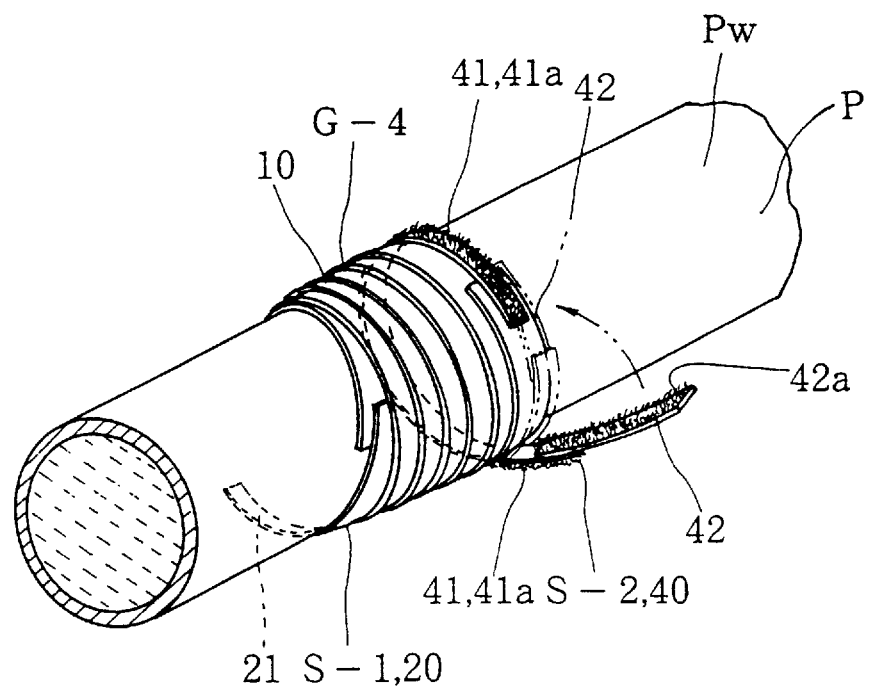

FIG. 30 shows how the rubber band G-4 is used.

DETAILED DESCRIPTION OF THE PREFERRED EMBODIMENTS

Figure 4:
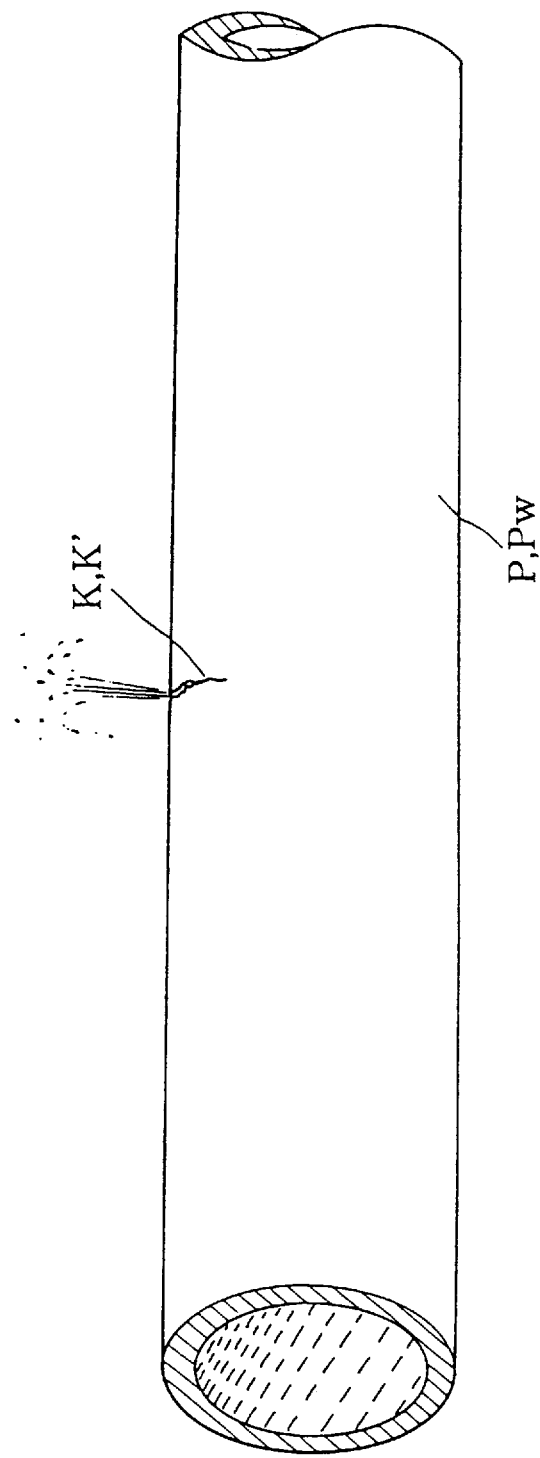
Figure 17:
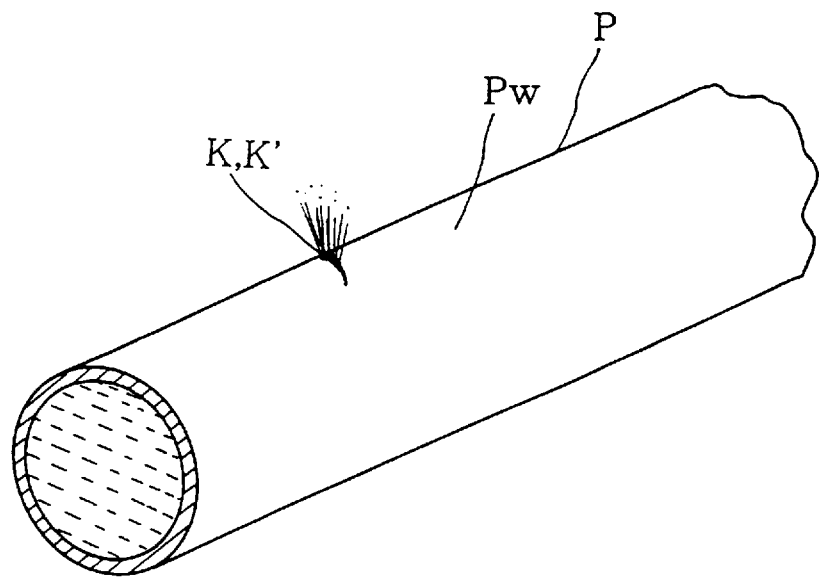

As shown in FIGS. 7, 13, 22 and 30, for example, rubber bands G-1 through G-4 shown are tightly wound about a pipe P of various types, for example water supply/exhaust pipe Pw, at a portion K where fluid flowing in the pipe such as liquid and gas is leaking from a crack K' as shown in FIGS. 4 and 17 to cut off such leakage from the crack K'.

The rubber bands G-3 and G-4 specifically shown in FIGS. 14 and 27 respectively are so constructed that they can be wound about the leaking portion K of the pipe P to securely seal the fluid leaking from the crack K' even when the pipe surface is not smooth or the crack K' is located near a stepped surface.

The rubber band G-1 according to the first embodiment of this invention will now be explained.

Figure 1:
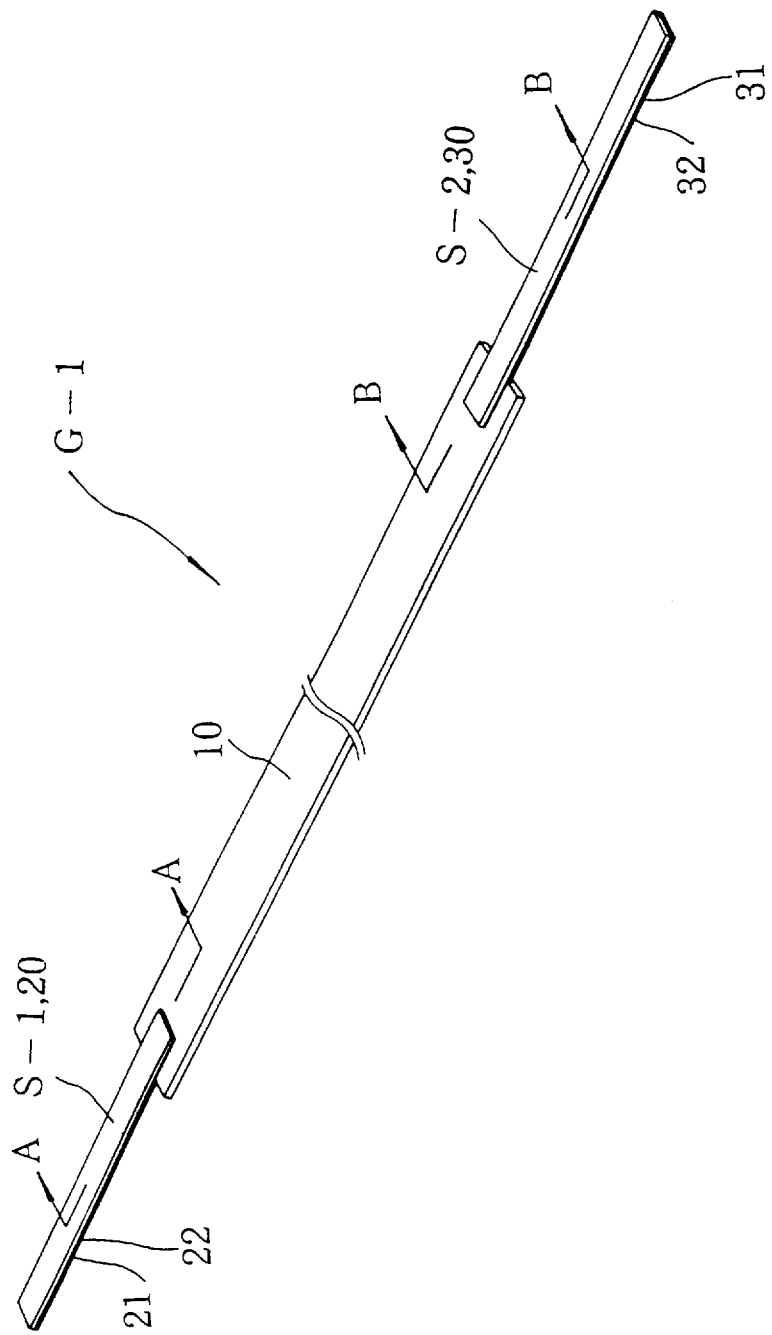

As specifically shown in FIG. 1, the rubber band G-1 according to the first embodiment comprises a main body 10 of the rubber band in the shape of a flat strap, an adhesive tape 20 provided on one end of the rubber band G-1 to act as a tentative fixing means S-1 for tentatively attaching this end of the rubber band G-1 to the water supply/exhaust pipe Pw, and an adhesive tape 30 provided on the other end of the rubber band G-1 to act as a retaining means S-2 for preventing loosening of the band G-1 wound about the water supply/exhaust pipe Pw.

The length and the width of the band main body 10 may be suitably selected depending on the diameter, etc. of the pipe Pw to which the band is wound. Preferably, the band main body 10 is made as thin as practically possible in order to reduce its thickness less conspicuous when wound about the pipe Pw as well as to maintain the appearance of the pipe Pw at the portion where it is sealed with the band. The band main body 10 may be made of natural or synthetic rubber.

Figure 2:
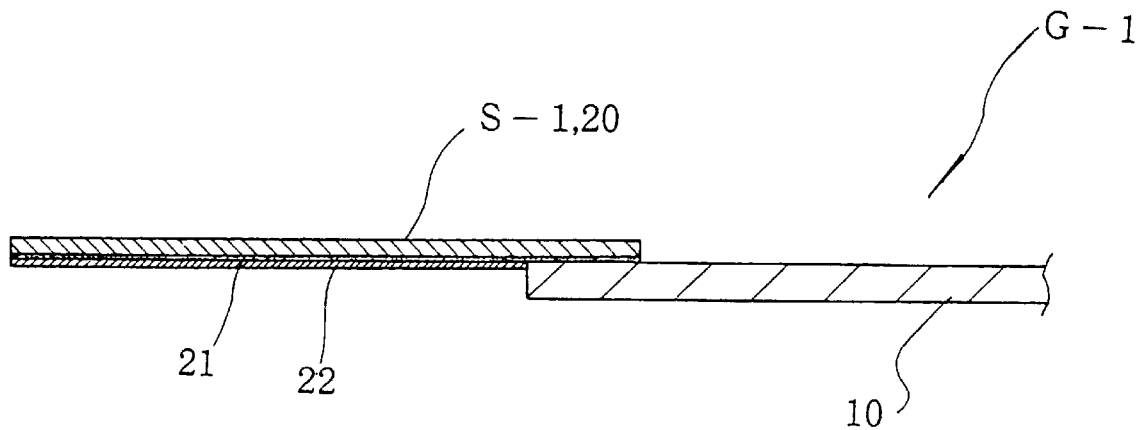
FIG. 2 is a sectional view of the rubber band G-1 along the line A—A in FIG. 1 to facilitate understanding of the construction of the adhesive tape 20 provided on one end of the band main body 10 of the first embodiment.

As specifically shown in FIGS. 1 and 2, one end of the adhesive tape 20 is attached to one end of the band main body 10 to extend outwardly therefrom in the direction of the band length. The adhesive tape 20 has on its one face an adhesive layer 21 provided with a protective liner 22 that can be peeled off.

Figure 3:
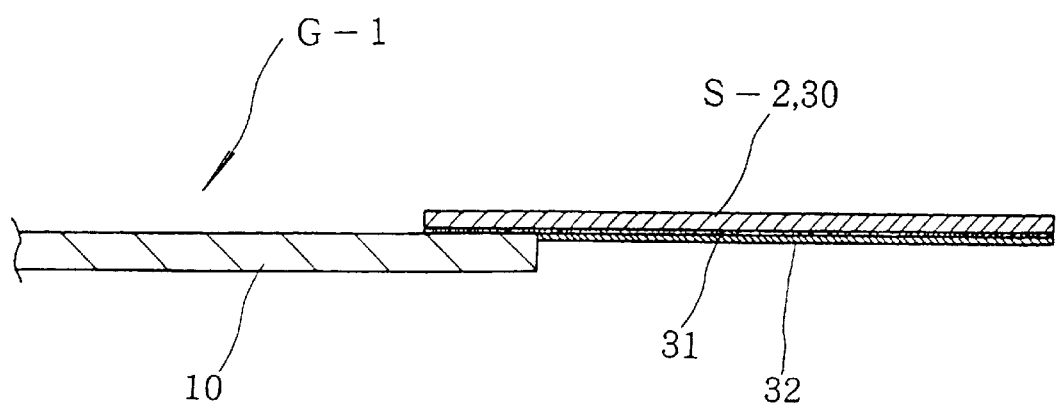
FIG. 3 is a sectional view of the rubber band G-1 along the line B—B in FIG. 1 to facilitate understanding of the construction of the adhesive tape 30 provided on the other end of the band main body of the first embodiment.

As specifically shown in FIGS. 1 and 3, one end of the adhesive tape 30 is attached to the other end of the band main body 10 where the adhesive tape 20 is not attached, to extend outwardly therefrom along the length of the band main body 10. The adhesive tape 30 also has, on the same side as the one where the adhesive layer 21 is provided on the tape 20, an adhesive layer 31 provided with a protective liner 32 that can be peeled off.

The length, width, etc. of the adhesive tapes 20 and 30 may be suitably varied depending on the needs. They can be attached to the band main body 10 by any suitable fixing means such as adhesion and fusion.

Figure 5:
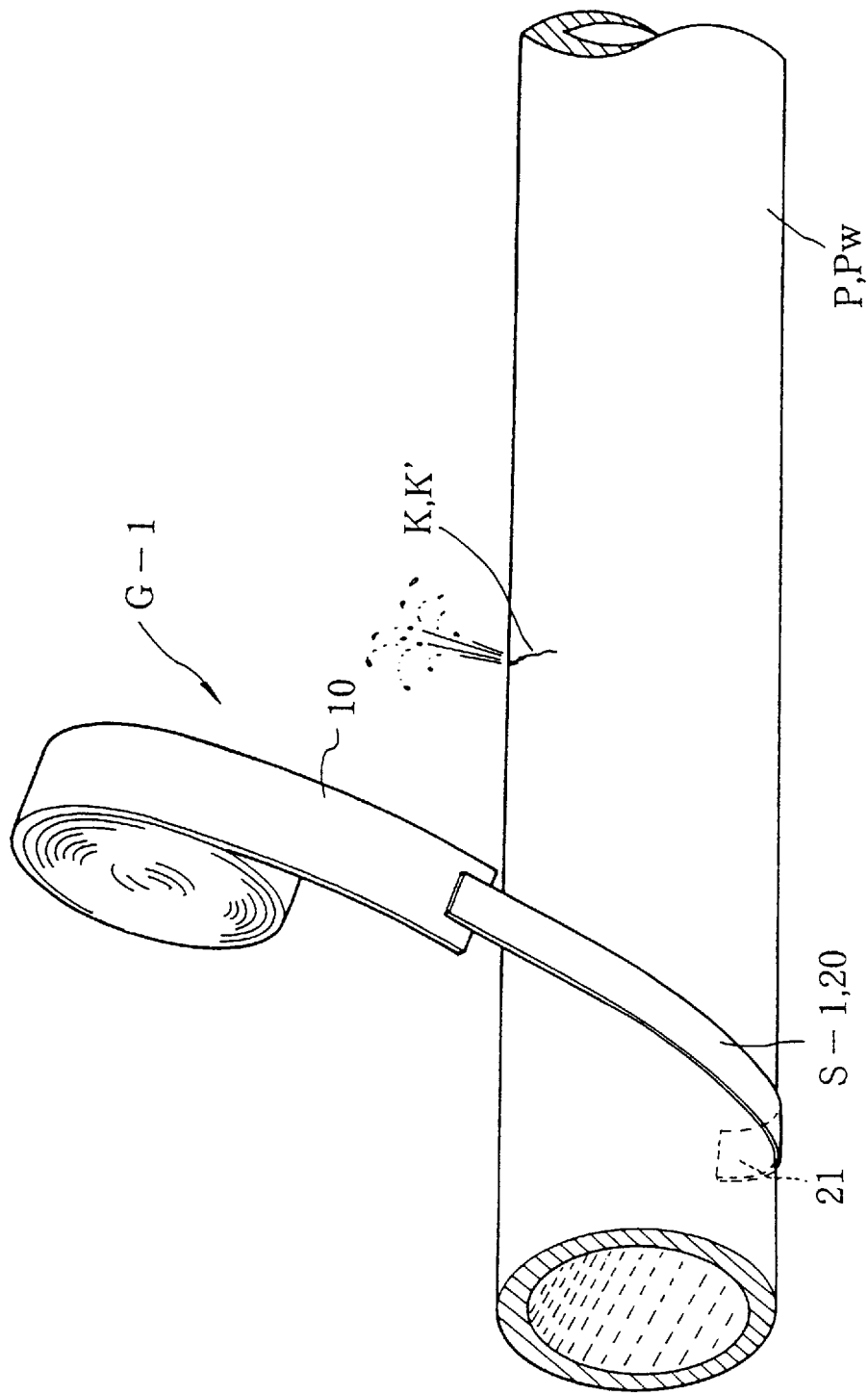

The rubber band G-1 of the above construction is such that, as shown in FIG. 5 for example, the adhesive tape 20 comes to be positioned at the end of the winding when used.

In this embodiment, the adhesive layers 21 and 31 of the adhesive tapes 20 and 30 respectively are protected with the peelable liners 22 and 32. It should be noted, however, that the liners 22 and 32 may be omitted and the adhesive tapes 20 and 30 may be formed as a tentative sealing fixing S-1 and a retaining means S-2 respectively.

Referring now to FIGS. 4 through 9, a method of repairing the pipe P using the rubber band G-1 of the above construction will now be explained with respect to cutting off of the leakage from the water supply/exhaust pipe Pw.

As shown in FIG. 5, the adhesive tape 20 of the rubber band G-1 peeled of its liner 22 is first wound about the pipe Pw at the crack K' shown in FIG. 4. The adhesive tape 20 may be applied either diagonal or normal to the axial center line of the pipe Pw as shown in FIG. 5.

By thus winding the adhesive tape 20 about the pipe Pw, the rubber band G-1 is tentatively fixed to the pipe Pw. As shown in FIG. 6, the band main body 10 is pulled hard with both hands while being wound about the pipe Pw tightly without gaps.

As shown in FIG. 7, the rubber band G-1 is continuously wound tightly about the pipe Pw to cover the crack K'. The liner 32 is peeled off from the adhesive tape 30 provided at the other end of the band main body 10 so that the adhesive tape 30 can be pasted on the pipe Pw on its adhesive layer 31.

As shown specifically in FIG. 7, the rubber band G-1 wound about the pipe Pw can be prevented from loosening. As the rubber band G-1 is tightly wound about the pipe Pw, water leaking from the cracked K' can be sealed, resisting against the pressure of the water being supplied/exhausted.

Now as shown in FIG. 8, a water cut-off tape T applied with a substance that reacts with water and becomes hardened is wound over the rubber band G-1 thus wound about the pipe Pw to entirely cover the band G-1.

As such mending tape T, there are known tape materials of woven or knitted fabric made of glass fiber and impregnated with polyurethane prepolymer which reacts with water and becomes hardened. The mending tape T can be easily wound as the leakage from the crack K' is now sealed by the rubber band G-1 which is tightly wound about the pipe Pw.

As the rubber band G-1 is fixed on the pipe Pw by means of the adhesive tapes 20 and 30 without knottings, the mending tape T can be wound closely over the band G-1 as well as about the peripheral surface of the pipe Pw, and the cut-off performance is assured by the hardening of the mending tape T thus tightly wound.

Consequently, even when the water supply/exhaust pipe is leaking, the present invention method secures water cut-off operation without the need to close the water valve or replace the pipe.

As the leakage is tentatively sealed by the rubber band G-1, the number of windings of the mending tape T at the leaking portion K can be minimized. The adhesive tapes 20 and 30 allow the rubber band G-1 to be wound about the pipe Pw without causing too much bulge. According to the present invention method, the appearance of the pipe Pw is well maintained at the leaking portion K after the water cut-off operation because the bulge due to winding of the rubber band G-1 can be minimized.

The rubber band G-2 of the second embodiment will now be explained. As specifically shown in FIG. 10, the rubber band G-2 according to the second embodiment comprises a band main body 10 of a flat strap, an adhesive tape 20 which is provided at one end of said rubber band G-2 and acts as a tentative fixing means S-1, and a face-to-face fastener 40 which is provided at the other end of said rubber band G-2 and acts as a retaining means S-2 for preventing loosening of the rubber band G-2 wound about the pipe Pw.

Similar to the rubber band G-1 of the first embodiment, the length, width, thickness and the material of the band main body 10 are suitably selected depending on the diameter, etc. of the water supply/exhaust pipe Pw to which the band is wound.

As specifically shown in FIGS. 10 and 11, one end of the adhesive tape 20 is fixed to one end of the band main body 10 to extend outwardly therefrom along the length of the band main body 10. The adhesive tape 20 is provided on one face thereof with an adhesive layer 21 which in turn has a peelable protective liner 22. Similar to rubber band G-1 of the first embodiment, the liner 22 can be omitted and replaced with an adhesive tape 20.

As shown specifically in FIGS. 10 and 12, the face-to-face fastener 40 is fixed to the band main body 10 on its end opposite the end where the adhesive tape 20 is fixed, the fastener 40 comprising a female fastener 41 of a flat strap which is fixed to said end of the band main body 10 to extend outwardly therefrom along its length and a male fastener 42 which is fixed to the other end of said female fastener 41 to continue therefrom. The female fastener 41 is so fixed to the band main body 10 that a female member 41a thereof which engages with the male fastener 42 faces the direction opposite the face of the adhesive tape 20 where the adhesive layer 21 is provided. The male fastener 42 is fixed to the female fastener 41 in such a manner that its male member 42a to be engaged with the female fastener 41 faces the direction opposite the face of the female section 41a.

The length, width, etc. of the adhesive tape 20 and the face-to-face fastener 40 may be arbitrarily varied depending on the need.

Fixing of the adhesive tape 20 and the female fastener 41 constituting the face-to-face fastener to the band main body 10 and of the male fastener 42 to the female fastener 41 may be achieved by any suitable means such as adhesion, fusion, etc.

The rubber band G-2 of the above construction is used by winding the same in such a manner that the adhesive tape 20 comes at the tail of the windings.

Similar to the rubber band G-1 of the first embodiment, the rubber band G-2 of the second embodiment can be wound about a water supply/exhaust pipe Pw which is leaking from the crack K', as shown in FIG. 4, by first peeling off the liner 22 from the adhesive tape 20 and tentatively fixing the band G-2 to the pipe Pw by means of the adhesive layer 21. As shown in FIG. 13, the rubber band G-2 is then tightly wound by pulling the same hard with both hands to cover the crack K'. By engaging the female member 41a of the female fastener 41 with the male member 42a of the male fastener 42 of the face-to-face fastener 40 at the end of the winding of the rubber band G-2, the rubber band G-2 can be prevented from loosening, and leakage from the crack K' can be cut off.

Similar to the rubber band G-1 of the first embodiment, the mending tape T is tightly wound over the rubber band G-2 thus applied about the pipe Pw, whereby the mending tape T which becomes hardened achieves secure sealing without impairing the appearance.

As the engagement of the male member 42a with the female member 41a of the face-to-face fastener 40 prevents the rubber band G-2 from loosening, the engagement face is less likely to be impaired even if the face-to-face fastener 40 becomes wet, etc. during the cut-off operation.

The rubber band G-3 of the third embodiment will now be explained. As specifically shown in FIG. 14, the rubber band G-3 comprises a band main body 10 of a flat strap, an adhesive tape 20 which is fixed to one end of the rubber band G-3 and acts as a tentative fixing means S-1 to fix this end of the band G-3 to the pipe Pw, and an adhesive tape 30 which is fixed to the other end of the rubber band G-3 and acts as a retaining means S-2 to prevent loosening of the rubber band G-3 wound about the pipe Pw.

The length and the width of the band main body 10 is suitably selected depending on the diameter of the pipe Pw to which the rubber band G-3 is wound. The thickness of the band main body 10 may also be suitably selected, but is made preferably as thin as practically possible in view of the appearance of the pipe P. The band main body 10 may be made of natural or synthetic rubber.

As specifically shown in FIGS. 14 and 15, one end of the adhesive tape 20 is fixed to one end of the band main body 10 to extend outwardly therefrom along its length. The adhesive tape 20 has on its one face with an adhesive layer 21 provided with a protective liner 22 that can be peeled off.

As shown specifically in FIGS. 14 and 16, one end of the adhesive tape 30 is fixed to the end of the band main body 10 opposite the end where the adhesive tape 20 is attached, to extend outwardly therefrom along its length. The adhesive tape 30 is provided, on its face which is on the same side as where the adhesive layer 21 is provided on the adhesive tape 20, with an adhesive layer 31 having a protective liner 32 that can be peeled off.

The length, width, etc. of the adhesive tapes 20 and 30 may suitably be varied depending on the need. They may be fixed to the band main body 10 by any suitable means such as adhesion and fusion.

In the rubber band G-3 of this embodiment, sealant 50 is applied on one face of the main body 10 toward its end where the tentative fixing means S-1 is attached, the sealant 50 being applied to substantially form a rectangle. The length and width of the sealant 50 may suitably be varied and applied on the face of the rubber band G-3 that comes in contact with the pipe P. The sealant 50 may be made of a rubber or plastic material capable of sealing joints and gaps water-tight or air-tight such as butadiene rubber having desired flexibility which is rendered by addition of a softening agent. Further, the surface of the sealant 50 is covered with a strip of peelable liner 51.

When the rubber band G-3 of the above construction is wound, the sealant 50 is prevented from adhering to the rubber band G-3 coming in contact therewith, enabling the rubber band G-3 to be conveniently wound about a pipe for use.

The rubber band G-3 of the above construction is wound in such a manner that the adhesive tape 20 is positioned at the tail of the windings as shown in FIG. 18.

Although the adhesive layers 21 and 31 respectively of the adhesive tapes 20 and 30 are protected with the liners 22 and 32, the liners 22 and 32 may be omitted; instead, the adhesive tapes 20 and 30 may respectively formed as a tentative fixing means S-1 and the retaining means S-2 respectively.

Referring now to FIGS. 17 through 26, the method of repairing the pipe P, particularly the water supply/exhaust pipe Pw, using the band rubber band G-3 of the above construction.

As shown in FIG. 18, the adhesive tape 20 peeled off of its liner 22 is first wound about the pipe Pw at the crack K' shown in FIG. 17 so that the adhesive layer 21 adheres to the pipe Pw. The adhesive tape 20 may be applied either diagonal or normal to the axial center line of the pipe Pw.

Figure 21:
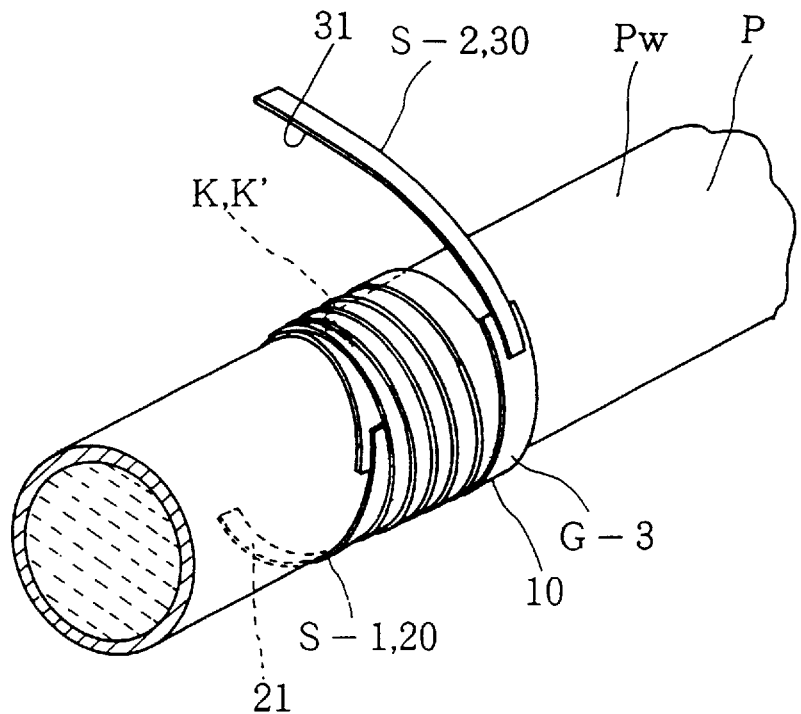
Figure 22:
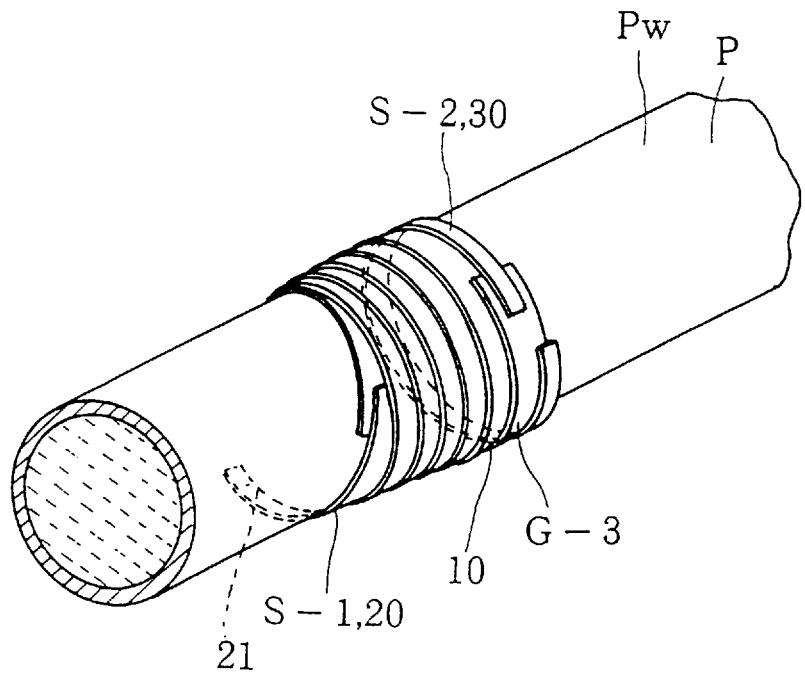

By thus winding the adhesive tape 20 about the pipe Pw, one end of the rubber band G-3 is now tentatively fixed on the pipe Pw near the crack K'. As shown in FIGS. 19 and 21, the band main body 10 is pulled hard with both hands while the rubber band G-3 is wound about the pipe Pw tightly without gaps.

While the rubber band G-3 is tentatively fixed, the liner 51 is simultaneously peeled off from the sealant 50 to allow the sealant 50 to seal the crack K' of the pipe Pw. With the crack K' thus sealed with the sealant 50, the rubber band G-3 is further wound about the pipe Pw as shown in FIGS. 19 and 21. Finally, the liner 32 is peeled off from the adhesive tape 30 provided on the band main body 10 at the end of the winding of the rubber band G-3, and the adhesive tape 30 is so wound that its adhesive layer 31 comes in contact with the pipe Pw at a position across the crack K' and opposite the position where the adhesive tape 20 is attached, to thereby prevent the rubber band G-3 from loosening.

As specifically shown in FIG. 20, the sealant 50 applied on the crack K' presses hard against the crack K' to tightly contact therewith, even if the surface of the pipe Pw near the crack K' is not smooth due to dusts, etc., or if the area near the crack K' is not flat because the edge e of a pipe joint P' is located near, as shown in FIGS. 25 and 26. Portion of the sealant 50 may even penetrate into the crack K' to keep it air-tight or water-tight. Thus, the rubber band G-3 is capable of securely sealing the water leakage at the crack K' of a water supply/exhaust pipe P by resisting the water pressure.

As shown in FIG. 23, a water cut-off tape T applied with a substance that reacts with water and becomes hardened is wound to completely cover the rubber band G-3 thus tightly wound about the pipe Pw. The mending tape T can be easily wound because the leakage from the crack K' is effectively sealed by the rubber band G-3 which is tightly wound about the pipe Pw.

As the rubber band G-3 is fixed to the pipe Pw by means of the adhesive tapes 20 and 30 without knots, the mending tape T can be wound tightly over the band G-3 as well as about the peripheral surface of the pipe Pw. As a result, cut-off performance can be secured by the hardening of the mending tape T which absorbs and reacts with water.

Consequently, even when the water supply pipe, not to mention the exhaust pipe, is leaking, the present invention method enables secure water cut-off operation to be performed without the need to close the valve or replace the pipe.

As the leakage is tentatively sealed by the rubber band G-3, the number of windings of the mending tape T at the leaking portion K can be minimized. The adhesive tapes 20 and 30 allow the rubber band G-3 to be wound about the pipe Pw without too much bulge. According to the present invention method, the appearance of the pipe Pw at the leaking portion K after the water cut-off operation is well maintained because the thickness increase due to winding of the rubber band G-3 can be minimized.

The rubber band G-4 of the fourth embodiment will be explained. As specifically shown in FIG. 27, the retaining means S-2 for preventing loosening of the rubber band G-4 in this embodiment is constructed with a face-to-face fastener. Since other features of the rubber band construction are identical or substantially identical with those of the rubber band G-3 according to the third embodiment, the identical parts in FIGS. 27 through 30 are given the same reference numbers as FIGS. 14 through 16 and their description is omitted.

As specifically shown in FIGS. 27 and 29, the face-to-face fastener 40 comprises a female fastener 41 of a flat strap which is fixed to one end of the band main body 10 to extend outwardly therefrom, and a male fastener 42 which is fixed to the other end of the band main body 10 where the female fastener 41 is not fixed. The female fastener 41 is so fixed that the female member 41a which engages with the male fastener 40 can be fixed on the side facing a direction opposite the side where the adhesive layer 21 is provided. The male fastener 42 is so fixed on the female fastener 41 that the male member 42a which engages with the female fastener 41 can be fixed to face a direction opposite the side where the female member 41a is provided.

After tightly winding the rubber band G-4 about the pipe Pw so that the sealant 50 covers the crack K', the male member 42*a* of the male fastener 42 is engaged with the female member 41*a* of the female fastener 41 at the end of the winding of the rubber band G-4, whereby the rubber band G-4 is prevented from loosening.

The length, width, etc. of the face-to-face fastener 40 may suitably be varied depending on the need. Fixing of the female fastener 41 to the band main body 10 and the male fastener 42 to the female fastener 41 may be achieved by any suitable means such as adhesion and fusion.

The rubber band G-4 of the above construction is used by winding the same in such a manner that the adhesive tape 20 comes at the tail of the winding. Since the engagement of the male member 42*a* with the female member 41*a* respectively of the face-to-face fastener 40 acts to prevent the rubber band G-4 from loosening, the force of this engagement is less likely to be impaired even when the fastener 40 gets wet during the water cut-off operation.

It is noted that the tentative fixing means S-1 in the rubber bands G-1 through G-4 of the above mentioned embodiments 1 through 4 may be of any construction so long as it can tentatively hold the rubber band in place on the pipe P at the beginning of its winding; for example, it may be an adhesive layer provided at the foremost end of the rubber band G from where its winding starts. It may also be a face-to-face fastener comprising a male member provided on one side of the rubber band of G-1 through G-4 and a female member provided on the other side of the said band. In case the tentative fixing means S-1 is a face-to-face fastener, it is particularly effective in that the foremost end of the rubber band can be securely fixed even when the rubber band gets wet.

The retaining means S-2 of the rubber bands G-1 through G-4 of the first through fourth embodiment may be of any construction so long as it can prevent loosening of the rubber band G which is tightly wound about the pipe P; for example, it may be an adhesive layer provided on the rubber band G at its end of the winding and on the side where the band is in contact with the pipe P.

What is claimed is:

1. A rubber band for pipe repairs to be wound about a portion of the pipe having a leak through which fluid such as liquid or gas is leaking, said rubber band comprising:
    a main body comprising a substantially flat strap composed of a rubber material;
    tentative fixing means, which is windable around the pipe, attached to an end of said main body, for tentatively fixing said substantially flat strap on the pipe, the tentative fixing means comprising at least one of an adhesive tape and a face to face fastener comprising a male member fixed to a face of the substantially flat strap and a female member fixed on an other face of the substantially flat strap; and
    retaining means attached to an other end of said main body to prevent said substantially flat strap from loosening around the pipe.

2. The rubber band according to claim 1, further comprising:
    sealant applied on one face of said main body intended to make contact with the pipe, near said end to which said tentative fixing means is attached.

3. The rubber band according to claim 2, wherein said sealant comprises a butadiene base rubber.

4. The rubber band according to claim 2, further comprising:
    a liner covering a surface of said sealant, wherein said liner is peelable away from said surface for application of said surface to the pipe.

5. The rubber band according to claim 1, wherein at least one of said tentative fixing means and said retaining means comprises adhesive tape.

6. The rubber band according to claim 1, wherein at least one of said tentative fixing means and said retaining means comprises a face-to-face fastener comprising a male member fixed to a face of the substantially flat strap and a female member fixed on an other face of the substantially flat strap.

7. A method for pipe repair, comprising:
    winding said rubber band according to claim 1 about a leaking portion of a pipe; and
    winding a mending tape having a substance that reacts with water and becomes hardened as a result of the reaction, over said rubber band.

8. The rubber band according to claim 3, further comprising:
    a liner covering a surface of said sealant, wherein said liner is peelable away from said surface for application of said surface to the pipe.

9. The rubber band according to claim 2, wherein at least one of said tentative fixing means and said retaining means comprises adhesive tape.

10. The rubber band according to claim 3, wherein at least one of said tentative fixing means and said retaining means comprises adhesive tape.

11. The rubber band according to claim 4, wherein at least one of said tentative fixing means and said retaining means comprises adhesive tape.

12. The rubber band according to claim 2, wherein at least one of said tentative fixing means and said retaining means comprises a face-to-face fastener comprising a male member fixed to a face of the substantially flat strap and a female member fixed on an other face of the substantially flat strap.

13. The rubber band according to claim 3, wherein at least one of said tentative fixing means and said retaining means comprises a face-to-face fastener comprising a male member fixed to a face of the substantially flat strap and a female member fixed on an other face of the substantially flat strap.

14. The rubber band according to claim 4, wherein at least one of said tentative fixing means and said retaining means comprises a face-to-face fastener comprising a male member fixed to a face of the substantially flat strap and a female member fixed on an other face of the substantially flat strap.

15. A method for pipe repair, comprising:
    winding said rubber band according to claim 2 about a leaking portion of a pipe; and
    winding a mending tape having a substance that reacts with water and becomes hardened as a result of the reaction, over said rubber band.

16. A method for pipe repair, comprising:
    winding said rubber band according to claim 3 about a leaking portion of a pipe; and
    winding a mending tape having a substance that reacts with water and becomes hardened as a result of the reaction, over said rubber band.

17. A method for pipe repair, comprising:
    winding said rubber band according to claim 4 about a leaking portion of a pipe; and
    winding a mending tape having a substance that reacts with water and becomes hardened as a result of the reaction, over said rubber band.

18. A method for pipe repair, comprising:
    winding said rubber band according to claim 5 about a leaking portion of a pipe; and
    winding a mending tape having a substance that reacts with water and becomes hardened as a result of the reaction, over said rubber band.

19. A method for pipe repair, comprising:

winding said rubber band according to claim 6 about a leaking portion of a pipe; and winding a mending tape having a substance that reacts with water and becomes hardened as a result of the reaction, over said rubber band.

20. The rubber band according to claim 1, wherein the main body comprises two faces, and wherein the tentative fixing means and the retaining means are on the same face of the main body.

21. A method for pipe repair, comprising:

winding said rubber band according to claim 20 about a leaking portion of a pipe; and winding a mending tape having a substance that reacts with water and becomes hardened as a result of the reaction, over said rubber band.

22. A rubber band for pipe repairs to be wound about a portion of the pipe having a leak through which fluid such as liquid or gas is leaking, said rubber band comprising:

a main body comprising a substantially flat strap composed of a rubber material;

a tentative fixing element, which is windable around the pipe, attached to an end of said main body, the tentative fixing element comprising at least one of an adhesive tape and a face to face fastener comprising a male member fixed to a face of the substantially flat strap and a female member fixed on an other face of the substantially flat strap; and a retaining element attached to an other end of said main body.

* * * * *